April 30, 1963   R. A. CHACE   3,087,297
GRASS CATCHERS
Filed Dec. 27, 1960
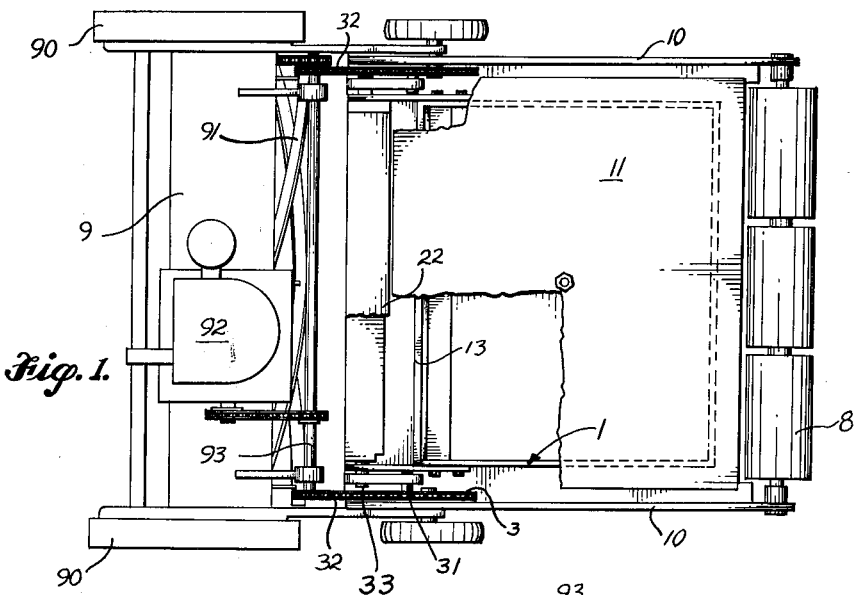
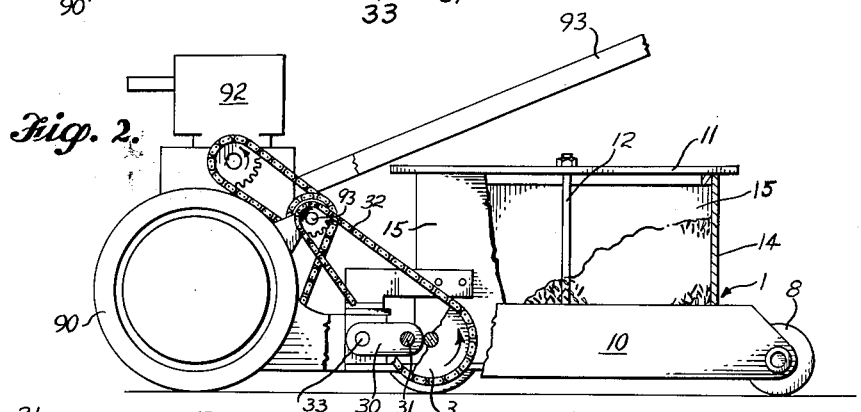
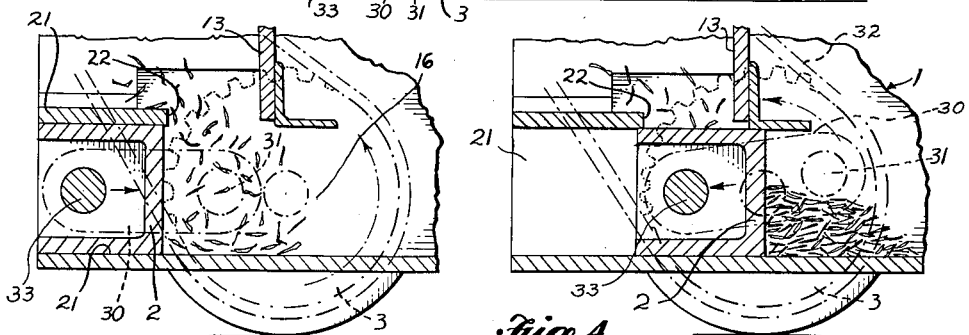
INVENTOR.
RICHARD A. CHACE
BY
Reynolds & Christensen
ATTORNEYS

3,087,297
GRASS CATCHERS
Richard Arthur Chace, 2560 94th Ave. NE.,
Bellevue, Wash.
Filed Dec. 27, 1960, Ser. No. 78,714
7 Claims. (Cl. 56—202)

It is common practice to employ an open basket trailing behind a lawn mower, especially one of the reel type, to catch the clippings. Such baskets tend to fill up towards their forward edge and the clippings soon spill forwardly onto the ground and impede the reel, and it is necessary to push them backwardly from time to time, and frequently to empty the loose clippings from the basket at a collecting point which may be rather distant from the point where the basket becomes filled. When a lawn is large or the growth is heavy, it is necessary to do this frequently, and it becomes a chore that, in addition to being tedious, greatly slows up the mowing operation.

It is an object of the present invention to provide a grass catcher wherein the clippings need be thrown only a short distance, and are received within a closed container and, in addition, are positively compressed therein during the entire mowing operation, and it will be possible by such compression to contain several times the quantity of grass that can be contained in a basket or similar catcher wherein the clippings rest loosely. Moreover, with such a catcher and compressor that is completely closed and wherein the clippings are continually disposed of, there is no likelihood that the clippings will spill onto the lawn or over into the rotating reel.

The primary object of the invention is to provide a grass catcher and compressor of the nature indicated, and secondarily to provide one which is of simple construction and inexpensive, and which is of such a size as will not impede the mowing operation more than does the normal basket or catcher occasionally.

It is also an object to provide a grass catcher and compressor of the character indicated in which the compressor element is caused to reciprocate during the entire mowing operation, and which can be driven in any of a variety of ways, as will appear more fully hereinafter.

With such objects in mind and others as will appear hereinafter, this invention comprises a novel grass catcher and compressor as shown in the accompanying drawings in a representative form, and as will be more fully explained herein, and the novel features whereof will be set forth in the accompanying claims.

FIGURE 1 is a plan view, partly broken away, showing a power mower of the reel type, with a grass catcher and compressor of the type with which this invention is concerned coupled thereto and driven therefrom.

FIGURE 2 is a side elevational view of the same, also partly broken away and with parts shown in section.

FIGURE 3 is an enlarged sectional view of a detail of the compressing chamber with the compressor bar moved forwardly away from the opening into the chamber in which the compressed clippings are stored so that fresh clippings may enter.

FIGURE 4 is a similar enlarged view showing the compressor bar advanced past the opening to the compressing chamber and pressing the clippings into the interior of the container.

The mower shown by way of illustration comprises a frame 9 supported on wheels 90 with its reel 91 power-driven from a motor 92. Such details are conventional and any type of mower may be employed provided it throws the clippings behind it. The mower is guided by a handle 93. Normally it would have a rear roller on which, in addition to the wheels 90, it would be supported, but such a roller may be used or may be omitted when the present invention is employed, inasmuch as the mower and the catcher which is in effect integral with the mower can be supported at the rear by rollers 8.

The grass catcher includes longitudinal frame bars 10 or the like which are joined to the mower frame 9 at their forward ends and which extend rearwardly to carry the rollers 8. Supported by such a frame is a container 1 which normally would be of a width comparable to the width of the mower with which it is to cooperate, this container being in effect a closed box. It would have a removable cover 11 or the like secured in place by a bolt 12 or similar means, whereby the entire contents may be emptied when necessary. It is to be noted in particular that the container 1 includes an upright forward wall 13 which stands up in the rear of the reel 91 and whereon the clippings impinge and then drop downwardly. It has also a rear wall 14 and side walls 15, all cooperating to define a closed chamber.

Just ahead of the wall 13 and offset forwardly from the interior of the container 1, at a level sufficiently low that it will not obstruct the clippings, is a compressing chamber 21 which at its rear end opens to the bottom portion of the container 1. This compressing chamber is open along its top immediately beneath the upright wall 13, as is shown by the slot 22. Grass clippings which impinge upon the wall 13 and fall downwardly will enter the compressing chamber through this entrance slot 22 and the aperture 16 into the chamber, provided the slot is not closed.

A compressor element or wall such as the channel-shaped bar 2 is guided in the compressing chamber 21 for repeated and reasonably rapid reciprocation forwardly and rearwardly. Its movement is sufficient that in its forward position, shown in FIGURE 3, it clears the entrance 22 and in its rearward position it completely closes this entrance and pushes ahead of it the clippings which have fallen through the entrance, these clippings being urged by the compressor bar into the interior of the container 1.

Reciprocation of the compressor element may be effected in a number of different ways. In the illustrated form, a wheel at each end of the container designated by the numeral 3 is rotative at all times during mowing, and is connected to the compressor bar through a link 30 joining pins 33 on the compressor bar and a pintle 31 located on and eccentrically of the axis of the wheel 3. Rotation of the wheel 3 may be effected by a power drive suggested by the chain drive 32 from the jack shaft 93 which is driven by the engine 92.

The container 1 is fixed to the rear of the mower frame 9 and while in use its cover 11 would be in place. As the mower advances, the clippings are thrown rearwardly, impinge against the upright wall 13, and drop through the opening 22 into the compressing chamber 21, where the repeated reciprocation of the compressor bar 2 urges them into the interior of the container. The container may start to fill, but when it does the compressor bar 2, acting with considerable force, compresses the grass into the interior of the container, and by reason of such compression the container will hold perhaps ten times as much grass as could be held thereby uncompressed. When the container is fully loaded, or when the mowing is done, it is only necessary to remove the cover 11 and invert the container 1 to dump its load.

I claim as my invention:

1. A grass catcher for use with a lawn mower or the like, comprising a container and means supporting the same for movement over the lawn with the mower, said container being closed during use except for an opening positioned to receive clippings from the mower, a compressor element guided in said container for movement past said opening to alternately open and close the same to receive clippings within the container, and to urge the clippings strongly into the interior of the container, actuating means operable during advance of the container to reciprocate said compressor element repeatedly, and a drive means driven by advance of the mower, operatively connected to drive said actuating means.

2. A grass catcher for use with a lawn mower or the like comprising a container and means supporting the same for movement over the lawn with the mower, said container being closed during use and having an upright forward wall to halt rearward projection of the clippings from the mower, and a compressing chamber forwardly of said container having an opening below said wall and communicating with said container, said compressing chamber being open at its top to receive the clippings, a compressor bar guided in said compressing chamber for forward movement to clear said opening, and for rearward movement past the opening to press clippings into the container, and means operable by and during advance of the container to reciprocate said compressor bar repeatedly forwardly and rearwardly.

3. A grass catcher for use behind a lawn mower or the like comprising carriage means movable over the lawn with the mower and defining a container having forward, rear, and side walls, said container having an opening in its lower forward wall positioned to receive the grass clippings from the mower, a compressor element, means guiding said compressor element in the lower portion of said carriage means, ahead of said opening, for reciprocative movement rearwardly into said opening and forwardly therefrom, an actuating means continuously operable during advance of the mower and carriage and drive means for said compressor element operatively connected for actuation by said actuating means, to effect continuous reciprocation of the compressor element during advance of the mower and carriage means.

4. A grass catcher for use behind a lawn mower or the like comprising carriage means movable over the lawn with the mower and defining a container having an opening in its lower forward wall positioned to receive the grass clippings from the mower, baffle means dividing the container into a rearward chamber for storage of grass clippings and a forward chamber communicating therewith by way of said opening, and located to receive grass clippings from the mower, said baffle means being separated from the bottom of the container by a space, a compressor element mounted in the bottom portion of the forward chamber ahead of said opening for substantially horizontal reciprocal movement, and means operable by and during movement of the carriage means to reciprocate the compressor element into and out of the opening.

5. A grass catcher according to claim 4 wherein the carriage means includes a pair of wheels mounted for driven movement as the catcher moves over the lawn with the mower and each having a pintle thereon eccentric of its axis, said compressor element reciprocating means including a link connecting each pintle with the compressor element to reciprocate the wall as the wheels are driven.

6. A grass catcher for use behind a lawn mower or the like comprising carriage means movable over the lawn with the mower and defining a container divided by a wall forming forward and rearward chambers arranged in tandem and having the bottom portions thereof connected by an opening in the wall, at least the forward chamber being open at the top to receive grass clippings from the mower, substantially horizontal baffle means in the forward chamber separating the bottom portion thereof from the rest of the forward chamber and having a slot therein adjacent said wall opening, a compressor bar slidably mounted in said bottom portion of the forward chamber for substantially horizontal reciprocal movement therein, and means operable by and during movement of the carriage means to reciprocate the compressor bar toward and away from the wall opening while closing and opening the slot, respectively.

7. A grass catcher for use with a lawn mower or the like, comprising carriage means movable over the lawn with the mower and defining a chamber having an upright forward wall and a rear wall one of which is apertured in its lower portion, in a position to receive grass clippings from the mower, a compressor element, means carried by said carriage means and guiding said compressor element for reciprocative movement into the aperture in its apertured wall, to force clippings into and to compress the grass clippings in the chamber, and to reopen the aperture for admission of additional clippings, an actuating means for said compressor element arranged for continuous operation by and during advance of the mower and carriage means, and a drive means for said compressor element operatively connected for actuation by said actuating means, to effect continuous reciprocation of the compressor element during advance of the mower and carriage means.

References Cited in the file of this patent

UNITED STATES PATENTS

| | | |
|---|---|---|
| 587,005 | Kyle | July 27, 1897 |
| 1,519,714 | Allen | Dec. 16, 1924 |
| 1,622,611 | Sera | Mar. 29, 1927 |
| 2,757,602 | Nolt | Aug. 7, 1956 |
| 2,984,850 | Law et al. | May 23, 1961 |